Oct. 11, 1966  C. H. WILLSEY ETAL  3,278,025
ARTICLE TRANSFER APPARATUS
Filed Sept. 14, 1964  7 Sheets-Sheet 2
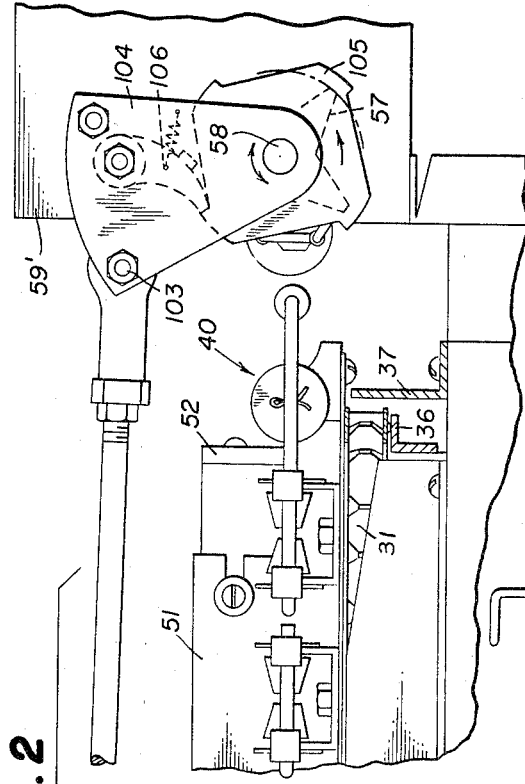
FIG. 2
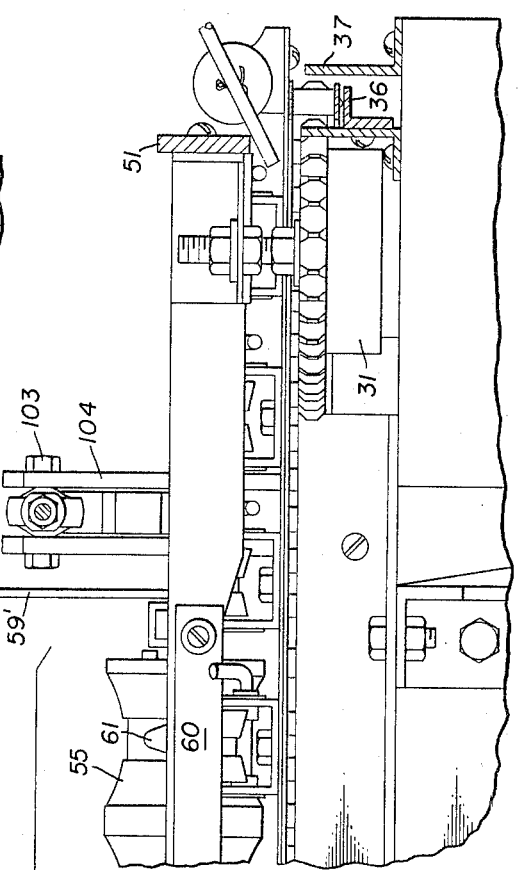
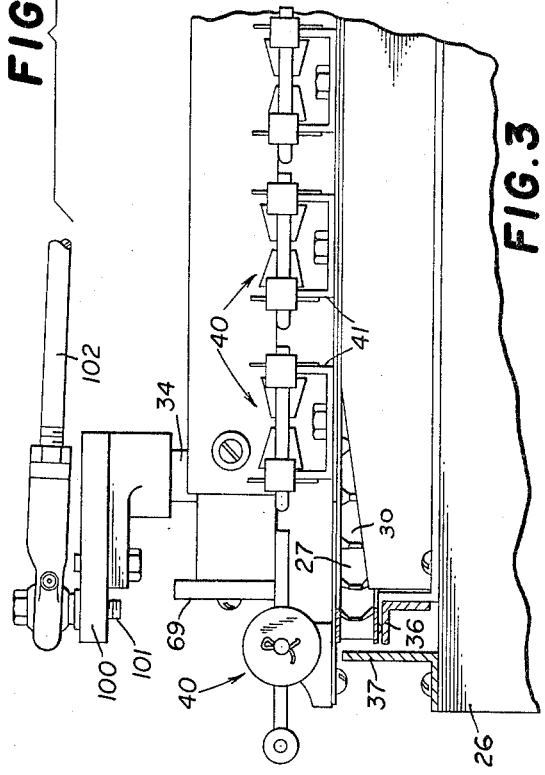
FIG. 3
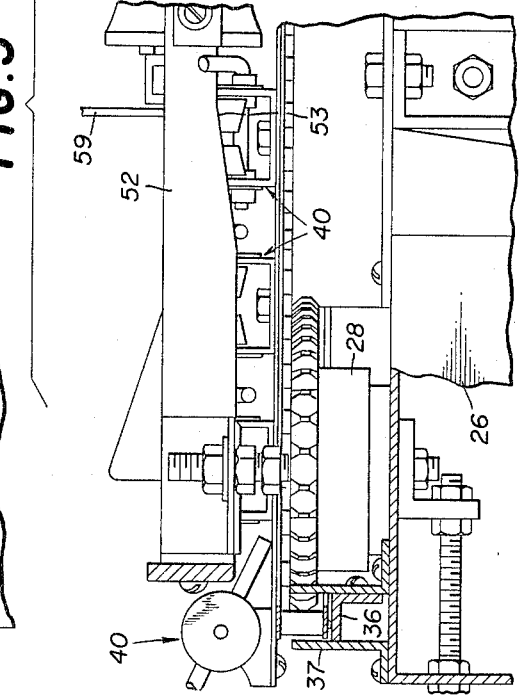

Oct. 11, 1966

C. H. WILLSEY ETAL 3,278,025

ARTICLE TRANSFER APPARATUS

Filed Sept. 14, 1964

INVENTORS
CHARLES H. WILLSEY
WILLIAM B. CRAWFORD
OWEN H. SCHULTZ

BY Grist, Lockwood,
Greenawalt & Dewey.

ATTYS

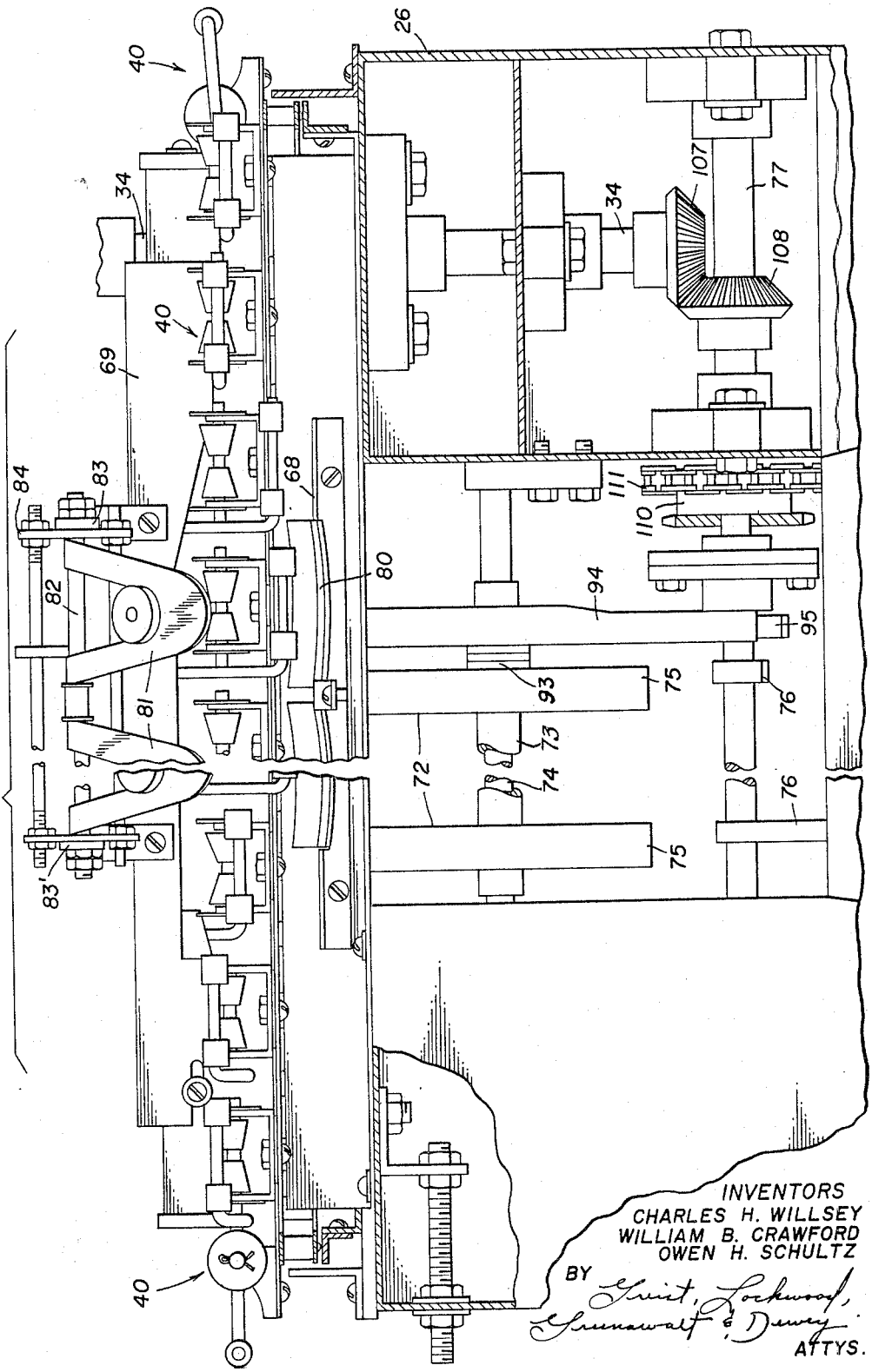

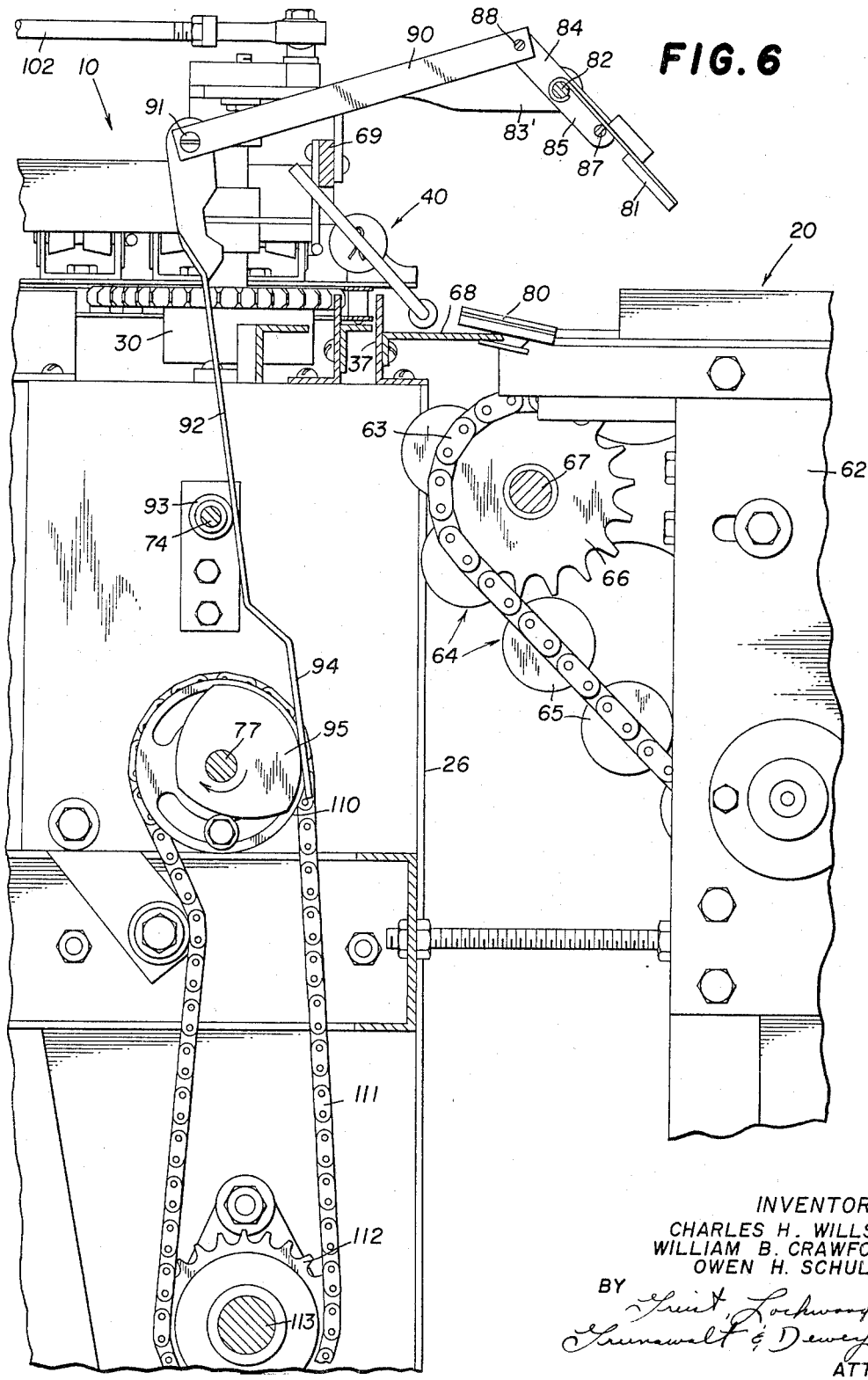

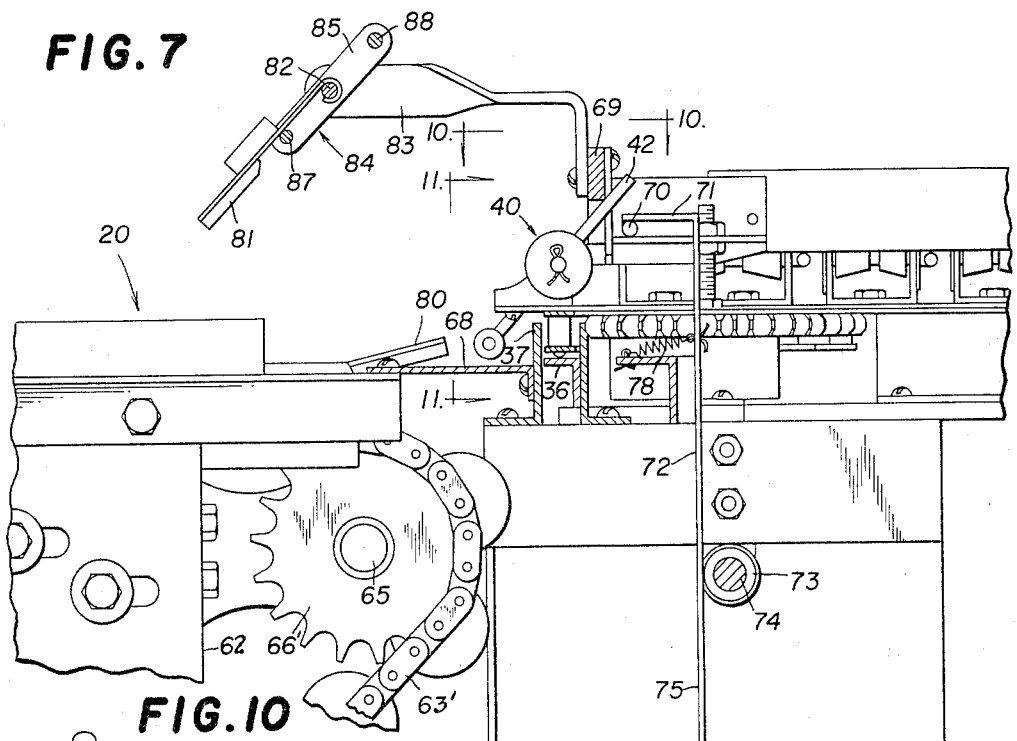
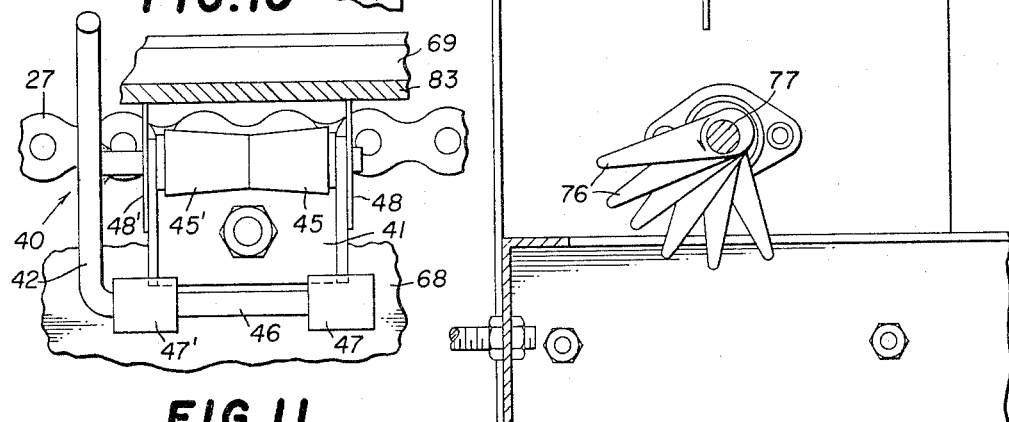
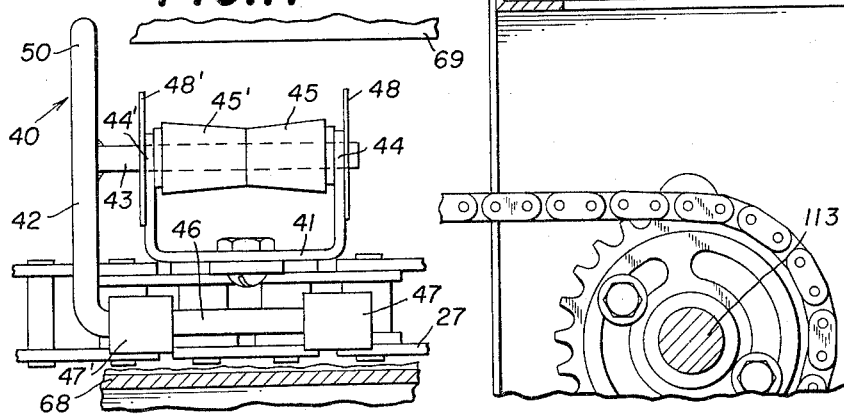

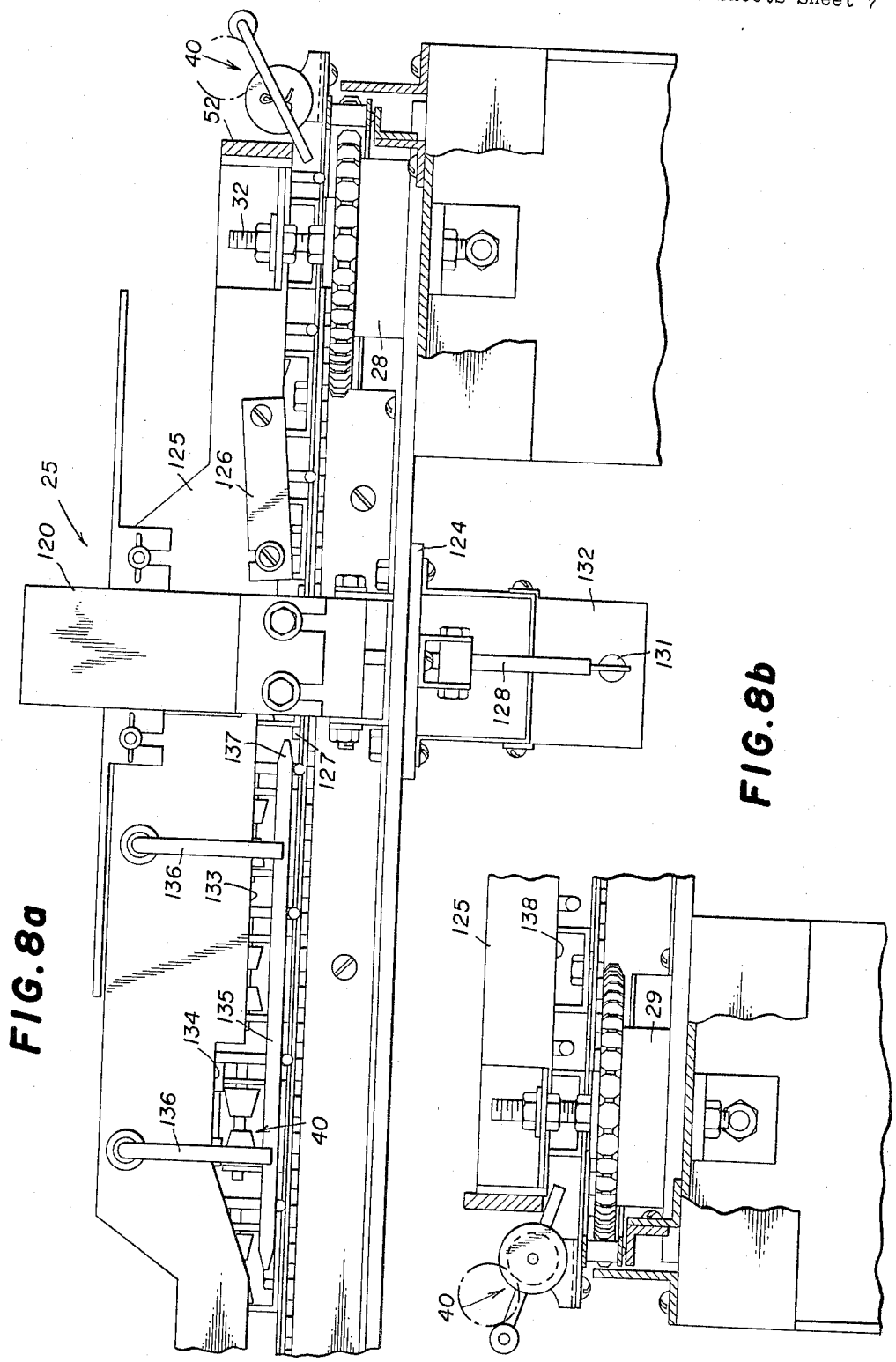

Уnited States Patent Office 3,278,025
Patented Oct. 11, 1966

3,278,025
ARTICLE TRANSFER APPARATUS
Charles H. Willsey, William B. Crawford, and Owen H. Schultz, Topeka, Kans., assignors, by mesne assignments, to Norris Grain Company, Chicago, Ill., a corporation of Illinois
Filed Sept. 14, 1964, Ser. No. 395,992
20 Claims. (Cl. 209—111.7)

This invention relates to article handling and is more particularly concerned with apparatus for transferring, in single line arrangement, small articles, such as shell eggs, from a receiving area, where they are fed from a conveyor or other supply source, to a discharge area, where they are automatically deposited in predetermined row forming relation for advance to other equipment.

It is a general object of the invention to provide an apparatus for transferring or conveying articles of a relatively fragile nature, for example, shell eggs or the like, from a receiving area from which they are delivered to the apparatus in successive rows of a predetermined number, to a discharge area where they are deposited in predetermined row forming arrangement which apparatus transports the eggs in a single line so as to facilitate inspection or the like of the individual eggs while they are in transit.

It is a more specific object of the invention to provide an egg transfer or forwarding conveyor which is interposed between an egg receiving area where it is loaded with the eggs and a discharge area where the eggs are automatically discharged from the conveyor, which conveyor is characterized by an endless supporting chain carried in a horizontal path on spaced sprockets which are mounted on vertically disposed, parallel shafts, with the endless chain having longitudinally spaced pocket forming members adapted to support the eggs with their long axes extending generally lengthwise of the chain and including pivotally mounted cam actuated support members which are adapted to be swung to a position to cause the eggs to move by gravity outwardly of the path of the conveyor so that they are discharged from the conveyor pockets.

It is a still more specific object of the invention to provide an egg transfer conveyor which is supported for movement in a horizontal plane by spaced sprockets which are carried on parallel vertically disposed shafts, with the conveyor traveling in a closed generally rectangular path and adapted to receive the eggs along one side thereof in successive row arrangement, to advance the eggs to the discharge area in a continuous single line arrangement, and to automatically deposit each successive egg in a pocket of a forwarding conveyor so that the eggs are carried away from the discharge area in predetermined arrangement.

It is a further object of the invention to provide an egg transfer conveyor of the type described wherein the conveyor has a plurality of longitudinally spaced pocket forming assemblies for receiving the eggs in row arrangement from a multiple row feed conveyor and wherein the pocket forming assemblies include movable support means operable by movable trip rails which are provided in the discharge area with cam mechanism for operating the same automatically to discharge the eggs from successive pockets into a multiple row conveyor where the eggs are spaced a predetermined distance apart which may differ from the spacing on the transfer conveyor or the spacing in the rows which are supplied to the transfer conveyor.

These and other objects and advantages of the invention will be apparent from a consideration of the apparatus which is shown by way of illustration in the accompanying drawings wherein:

FIGURE 2 is a side elevation of the apparatus, to an enlarged scale and with portions broken away, the view being taken on the line 2—2 of FIGURE 1;

FIGURE 3 is a sectional view taken on the line 3—3 of FIGURE 1, to an enlarged scale and with portions broken away;

FIGURE 5 is a sectional view taken on the line 5—5 of FIGURE 1 to an enlarged scale and with portions broken away;

FIGURE 6 is a sectional view taken on the line 6—6 of FIGURE 1 to an enlarged scale and with portions broken away;

FIGURE 7 is a sectional view taken on the line 7—7 of FIGURE 1, to an enlarged scale and with portions broken away;

FIGURE 8a is a sectional view taken on the line 8a—8a of FIGURE 1, to an enlarged scale and with portions broken away;

FIGURE 8b is a sectional view taken on the line 8b—8b of FIGURE 1, to an enlarged scale and with portions broken away;

FIGURE 10 is a fragmentary view taken on the line 10—10 of FIGURE 7, to a still larger scale; and FIGURE 11 is a fragmentary view taken on the line 11—11 of FIGURE 7, to a still larger scale.

Figure 1:
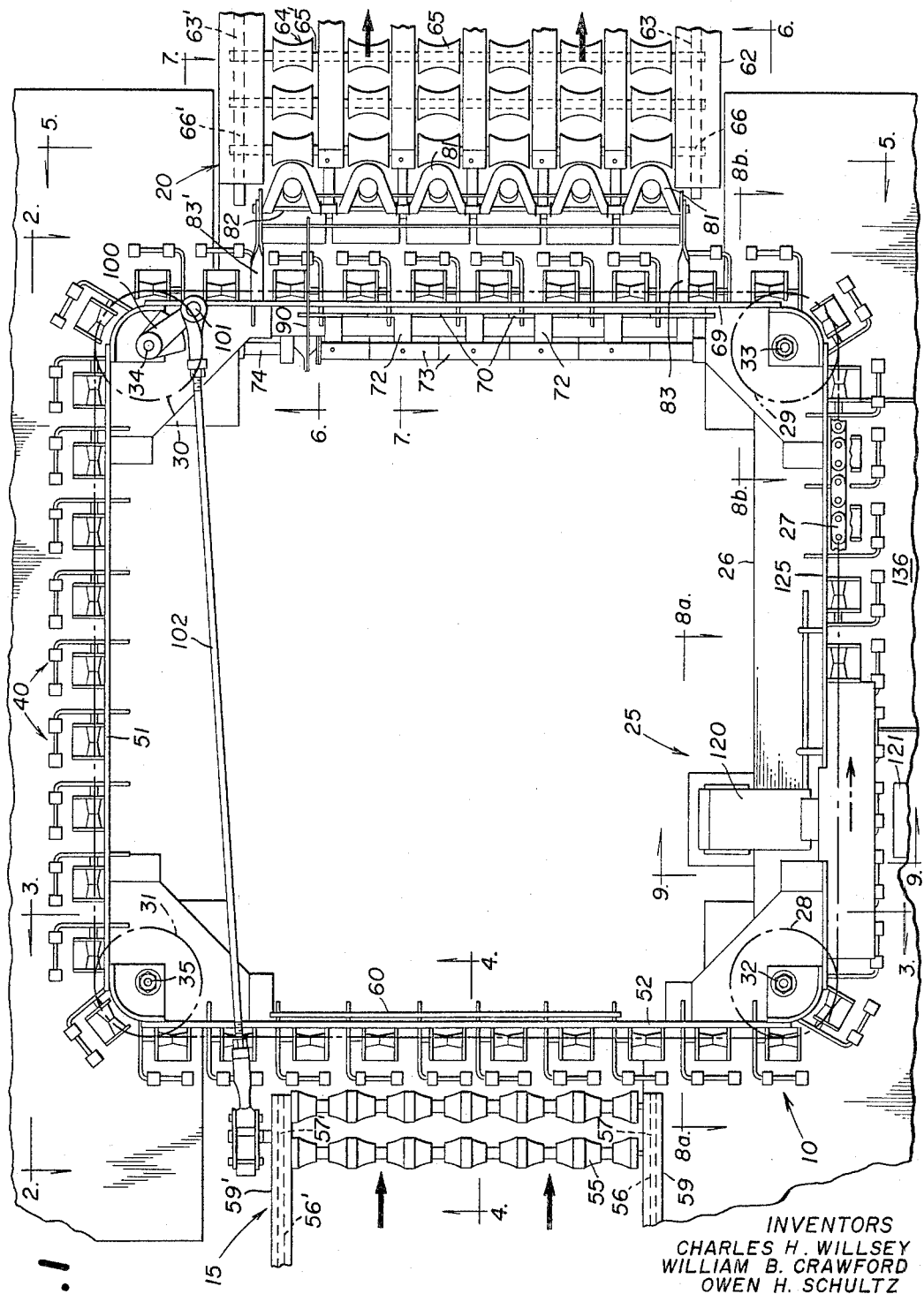
FIGURE 1 is a plan view of an egg transfer apparatus which incorporates the principles of the invention and which is shown employed with egg inspection equipment interposed between the discharge end of an egg washing machine and an egg grading and packing apparatus.

The apparatus of the present invention is illustrated in the drawings in connection with egg handling operations which include an inspection arrangement for detecting eggs which are defective and undesirable because of the presence of spots of blood therein and for eliminating these defective eggs as they are discharged from an egg washing machine and transferred to an infeed conveyor for a grading and packing machine. The illustrated arrangement is for convenience in describing the invention and represents only one use of the transfer apparatus. It will be understood that the apparatus is not limited to the illustrated use but it is contemplated that it may be employed also in combination with other egg handling equipment wherever it is desired to transfer or transport eggs delivered thereto in successive rows and to deposit the eggs at a discharge area in timed relation for loading a conveyor or the like which receives the eggs in either single line or multiple row arrangement and advance the eggs from the discharge area to other handling or processing equipment.

In the illustrated arrangement the transfer conveyor 10 (FIGURE 1) is interposed between the discharge end of an egg conveyor 15 which delivers eggs from an egg washing machine and the receiving end of a multiple line or row conveyor 20 for an egg grading machine or other handling equipment. The transfer conveyor 10 is arranged for operation in a horizontal plane and is disposed so that it travels in a path which is generally rectangular with one side or run along the end of the washing machine conveyor 15 and the opposite side or run along the end of the grading conveyor 20. In the arrangement shown a blood detector and reject apparatus 25 is disposed along one of the other sides of the rectangle which extends between the washing machine conveyor 15 and the grading conveyor 20 so that eggs which are undesirable because of the presence of blood spots may be eliminated in the course of the transfer from the washing machine to the grading machine.

Figure 4:
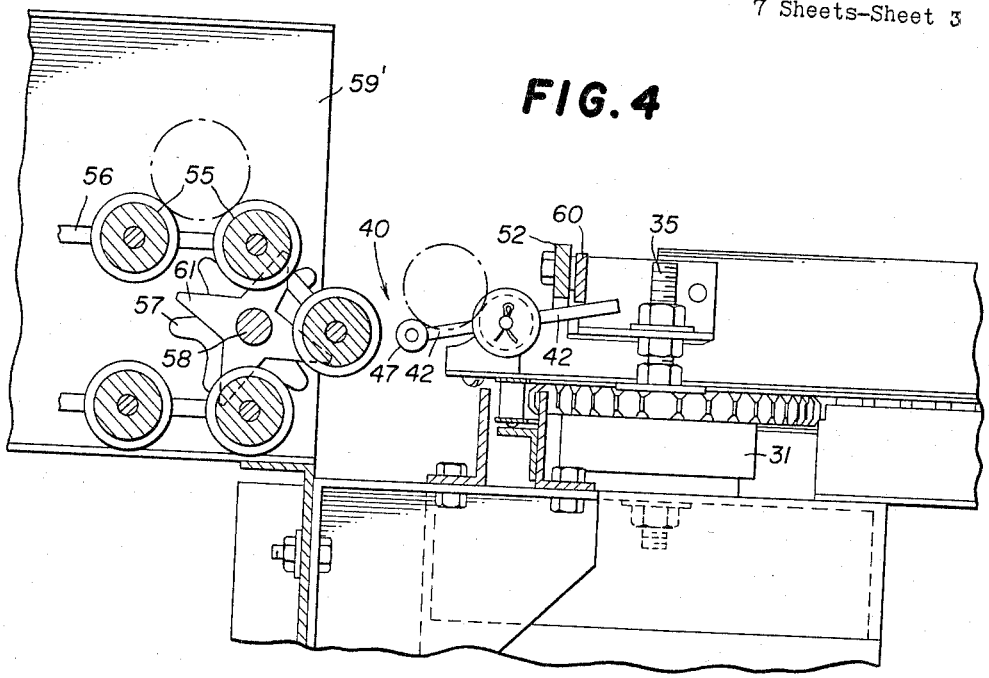
FIGURE 4 is a sectional view taken on the line 4—4 of FIGURE 1, to an enlarged scale and with portions broken away.

The transfer conveyor 10 is supported on an upright frame structure 26 and comprises an endless chain 27 which is carried on four spaced sprockets 28, 29, 30 and 31, the latter being mounted in rectangular arrangement at the upper ends of parallel vertical shafts 32, 33, 34 and 35. The chain 27 is supported and guided on the horizontally disposed legs of track forming angle members 36 extending in path forming relation between the sprockets 28, 29, 30 and 31. A guard member is formed by the upright leg of an angle bar 37 secured along the outer edge of the track member 36. The chain 27 carries on its upper horizontal face a plurality of pocket forming egg supporting assemblies 40. Each assembly 40 (FIGURES 6, 10 and 11) comprises an upwardly opening U-shaped bracket 41 bolted or otherwise secured to the top face of the chain 27. The spaced upstanding legs of the bracket 41 support in pivoted relation a frame-like carrier finger 42. The carrier finger 42 is generally F-shaped with one bar member 43 being journaled in bearing forming apertures 44 and 44' in the upstanding legs of the U-shaped bracket 41. The pivot bar member 43 carries between the legs of the bracket 41 a pair of co-operating egg supporting spool-like members or pads 45 and 45' of rubber or similar material which are of truncated cone shape with their smaller ends in abutting relation so that the peripheral surfaces taper slightly toward each other and conform approximately to the contour or elliptical surface of an egg. The outer bar member 46 of the carrier finger 42 which is parallel with the pivot bar member 43 is provided with two cylindrical pads 47 and 47' which are axially spaced thereon. The pads 47 and 47' are of rubber or similar material and are of substantially greater diameter than the diameter of the bar 46 so as to co-operate with the pads or spool members 45 and 45' in forming a pocket for supporting an egg when the finger member 42 is disposed in the position shown in FIGURE 4. Small discs 48 and 48' of rubber-like material are provided at the outer ends of the pads 45 and 45' to absorb some of the shock of impact of the eggs coming onto the carrier fingers 42 and also to assist in aligning the eggs in the pockets. The carrier finger 42 is adapted to be controlled by engaging the free end 50 with track forming cam members spaced along the path of travel of the chain 27. A vertically disposed cam plate or bar, indicated at 51 (FIGURES 2 and 3), extends along one side of the conveyor 10 above the chain 27 and the lower edge holds the fingers 42 in position to receive the eggs as the assemblies 40 move around the sprocket 31 and enter the conveyor path extending transversely along the end of the conveyor 15. A vertically disposed cam plate 52 (FIGURE 3) extends along the path of the conveyor 10 at the end of the conveyor 15 with the lower track forming edge having a portion 53 which is offset upwardly along the end of the conveyor 15 so that the pads 47 and 47' are dropped down somewhat to receive the eggs from the pocket forming roller assemblies 55 on the conveyor 15 (FIGURE 4).

The roller assemblies 55 on the conveyor 15 support the eggs in transverse rows with the eggs in each row having their long axes generally aligned. The assemblies 55 are illustrated and described in Willsey Patent No. 2,979,746 dated April 19, 1961 to which reference may be had for details thereof. The conveyor 15 comprises a pair of endless chains 56 and 56' which are laterally spaced and connected by a plurality of pocket forming assemblies 55. The chains 56 and 56' are carried at the end of the washing machine conveyor 15 on a pair of sprockets 57 and 57' mounted on opposite ends of a cross shaft 58 which is journaled in the spaced vertical side plates 59 and 59' of the washing machine conveyor frame. A shock absorbing metal bar 60 is secured loosely on the vertical face of the cam plate 52 and rises slightly in reaction to the striking of the finger extension 50 when an egg is deposited on the finger 42 to cushion the eggs when they roll off the washing machine conveyor. The cross shaft 58 carries star wheels 61 (FIGURE 4) arranged relative to the pocket assemblies 55 so as to assist in ejecting the eggs from the pocket assemblies 55.

At the other side of the transfer conveyor 10 a multiple line, multiple row conveyor 20 (FIGURES 1, 6 and 7) is provided for receiving the eggs. The conveyor 20 is supported on an upright subframe 62 which may constitute part of a grader or other handling or processing equipment. The conveyor 20 comprises a pair of laterally spaced chains 63, 63' and a plurality of transversely extending pocket forming roller assemblies 64 supported in longitudinally spaced relation on the chains 63, 63'. Each roller assembly 64 comprises a plurality of rollers or spool members 65 axially spaced on parallel transversely extending, longitudinally spaced rods 65' which connect the two chains 63 and 63'. The pocket forming rollers or spools 65 have exterior surfaces which are concave in longitudinal cross section so that each spool 65 co-operates with the adjacent spools on the preceding and succeeding rods 65' which are aligned therewith to form pockets for receiving the eggs and transporting the same. The chains 63, 63' are carried on a pair of end sprockets 66, 66' mounted on a transverse shaft 67. A connecting plate 68 extends between the end of the support frame 62 and the vertical guard member 37 on the supporting frame 26 for the transfer conveyor 10. The eggs are delivered from the continuously traveling conveyor 10 to the pockets in the conveyor 20, which may be advanced with a constant fixed rate of speed, or it may be advanced intermittently by tripping the egg supporting finger members 42 in proper sequence and in timed relation so that the eggs are released or dumped from the pockets of the conveyor 10 the proper distance apart and roll laterally of the conveyor 10 into the pockets in the conveyor 20. As the egg carrying assemblies 40 move around the sprocket 29 the carrier finger 42 is held by a vertical cam rail or plate 69 in egg supporting position. The lower cam track forming edge of the cam rail 69 is cut away along the major portion thereof and the pivoting of the carrier fingers 42 is controlled by a series of release rail sections 70. Each release rail section 70 (FIGURES 5, 6 and 7) is carried on the end of the upper horizontally disposed leg 71 of an angular support bracket 72 which has its vertical leg secured tangentially on a sleeve section 73 which is rotatably supported on a cross shaft 74. The tail end 75 of the bracket 72 extends below the supporting shaft 74 and in the path of one of a series of cams 76 mounted in axially spaced relation on a cam shaft 77 which is parallel with the shaft 74 and journaled in the frame below the same. A tension spring 78 is connected at one end to the bracket 72 and at the other end to a fixed portion of the frame and urges the bracket 72 in a counterclockwise direction, as viewed in FIGURE 7, so as to normally hold the rail sections 70 in a position for preventing egg discharging movement of the carrier finger 42. The cam plate 76 associated with each rail supporting bracket 72 is positioned so as to strike the end 75 of the bracket and move the associated rail section 70 in a clockwise path a sufficient distance to release the carrier finger 42 and allow the egg on the carrier assembly 40 to roll off the latter and onto a pad 80 which is slightly concave on its top surface and directs the egg into a pocket in the conveyor 20.

A series of damper forming pads 81 (FIGURES 1, 5, 6 and 7) are mounted on a cross shaft 82 which is journaled in a pair of laterally spaced angle brackets 83, 83' which are fixed in spaced relation on the vertical cam plate 69. A small elongate frame 84 comprising small rectangular end plates 85 and parallel rails 87 and 88 is pivotally mounted on the shaft 82 with the one rod 87 engaging beneath the bracket or carrier portions of the damper pads 81 and the other rod having a link 90 (FIGURES 1 and 6) connected thereto at one end, the other end of the link 90 being pivotally connected at 91 to the upper end of a bracket arm 92 which is tangentially secured on a sleeve 93 rotatably supported on the cross shaft 74 and having a tail end 94 engageable with a plate cam 95 on the cam shaft 77. The cam 95 swings the bracket arm 92 intermittently to raise and lower the damper pads 81 towards and from the transfer pads 80 so as to slow down the eggs as they roll across the transfer pads 80 into the pockets of the conveyor 20.

In the arrangement illustrated the transfer conveyor 10 is driven by the vertical shaft 34 (FIGURES 1, 2, 3 and 5). The shaft 34 has an upper extension on which there is secured a crank arm 100 which has its free end pivotally connected at 101 to a drive rod 102 for the conveyor 15. The drive rod 102 has its other end pivoted at 103 (FIGURE 2) between the upper ends of a pair of spaced, parallel plates forming a bracket 104 which is pivotally mounted at its lower end on the cross shaft 58 and straddles a toothed indexing wheel 105 fixed on the cross shaft 58. A spring controlled pivoted dog 106 in the bracket 104 co-operates with the indexing wheel 105 to reciprocate the bracket 104 and thus intermittently rotate the cross shaft 58 which drives the chains 56 and 56' of the conveyor 15.

The vertical shaft 34 (FIGURE 5) provides power for the transfer conveyor 10. It is journaled in the frame 26 and carries a pinion 107 at its lower end which is in driving engagement with the pinion 108 on the cross shaft 77. The shaft 77 carries a sprocket 110 (FIGURE 6) which is connected by a drive chain 111 with the sprocket 112 on a drive shaft 113 which is parallel with the shaft 77 and journaled in the main frame 26. The shaft 113 constitutes the main drive shaft and may be driven by chain connection from the grader, which also has a drive connection with the shaft 67 for the conveyor 20.

Figure 9:
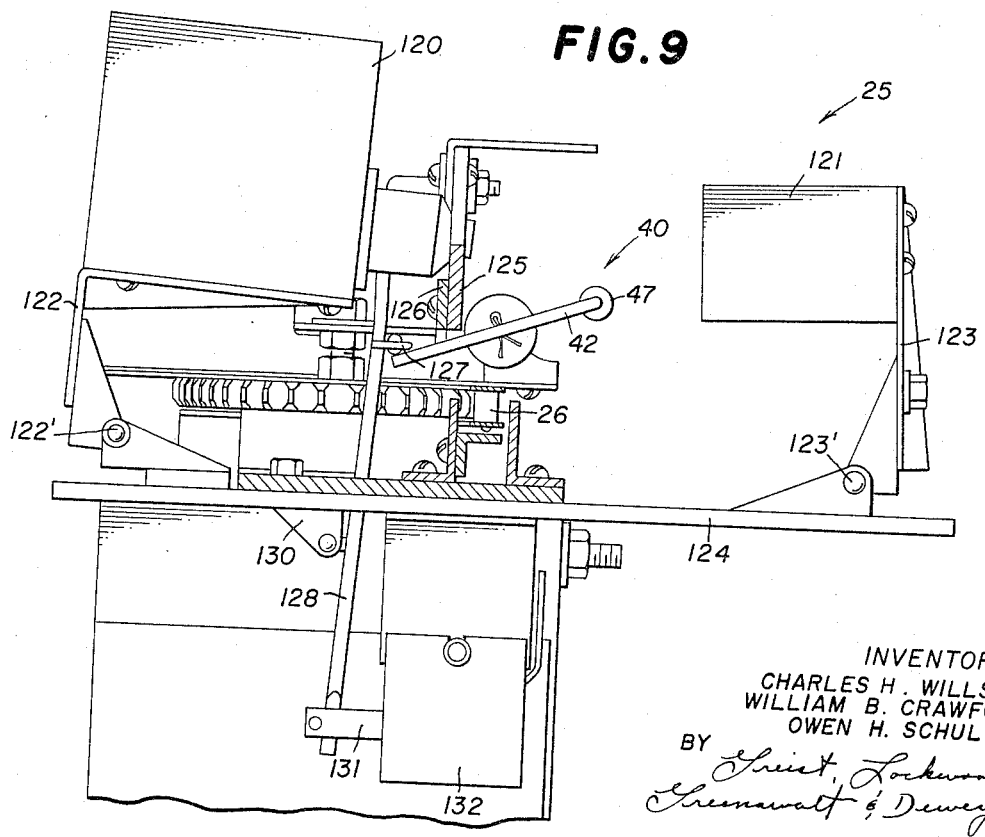
FIGURE 9 is a sectional view taken on the line 9—9 of FIGURE 1, to an enlarged scale and with portions broken away.

In the arrangement shown in FIGURE 1, the transfer apparatus has associated with it blood spot sensing apparatus 25 and associated mechanism for removing from the conveyor 10 undesirable eggs. The blood spot sensing mechanism comprises (FIGURES 8a, 8b, and 9) a blood detector or blood sensing device 120 and an associated light source 121. The detector device 120 is mounted on bracket 122 and the light source 121 is mounted on bracket 123, both brackets upstanding from and pivotally connected at 122' and 123' to a support plate 124 which extends on opposite sides of the path of the conveyor chain 27. A vertically disposed cam rail or plate 125 holds the carrier finger 42 in a position to support the egg on the pads 45, 45' and 47, 47'. An auxiliary cam plate 126 is fastened to the plate 125 at the approach side of the blood detector device 120 which is adjusted so as to raise the pads 47, 47' somewhat and bring the egg farther up into the effective inspection area between the detector device 120 and the light source 121 as illustrated in FIGURE 9. The plate 126 guides the carrier finger 42 beneath a reject rail 127 which is mounted on the upper end of a vertically disposed supporting arm 128. The arm 128 is pivotally supported on a U-shaped bracket 130 depending below the support plate 124 and has its lower end connected to the pole 131 of the solenoid 132 which is mounted below the plate 124 and operated by the detector device 120. If the detector device 120 determines that an egg is undesirable because of the presence of blood spots the solenoid 132 is operated to swing the arm 128 in a counter clockwise direction, as viewed in FIGURE 9, and withdraw the reject rail 127 which permits the carrier finger 42 to swing downwardly to egg discharge position, the cam plate 125 being cut away at 133 and 134 to permit this movement. A bypass rail 135 is supported by brackets 136 on the cam plate 125 which has a pointed end 137 aligned with the end of the reject rail 127 in the normal position of the latter. If the reject rail 127 is allowed to remain in the position shown in FIGURE 9 which occurs when the egg does not contain blood spots, the end 50 of the carrier finger 42 passes beneath the bypass rail 135 and continues to advance with the egg remaining supported in the assembly 40 on the chain 27. If the reject rail 127 is withdrawn by action of the solenoid 132 which occurs when the egg contains blood spots the end 50 of the carrier finger 42 passes above the bypass rail 135 and is guided along the cam edges 133 and 134 with the egg being allowed to roll off of the assembly 40 when the finger end 50 reaches the cut back portion 134 of the cam rail. The lower edge of the cam rail 125 beyond the cut back portion 134 is slanted to swing the carrier finger 42 back to its normal position after a bloody egg has been dumped and also serves to hold the egg in the pocket when the egg has not been rejected until the finger 42 reaches the end of the bypass rail 135.

In the illustrated arrangement the conveyor 10 is employed to transfer eggs from the discharge end of an egg washing or cleaning machine conveyor 15 where the eggs are delivered to the carrier assemblies 40 along a straight run of the conveyor 10, with the eggs coming off the conveyor 15 in successive rows of a predetermined number, six being shown, and at a predetermined spacing in the row, for example, 2½ inches on centers. The conveyor 15 is indexed to deliver a row of eggs at a time to the carrier assemblies 40 on the continuously traveling conveyor 10, the carriers 40 being spaced the same distance on centers and the movement of the conveyor 10 being timed to bring the proper number of carriers 40 into alignment with the eggs in each successive row as the conveyor 15 is indexed to advance the same for delivery over the end of conveyor 15. The eggs are advanced by the transfer conveyor 10 in single line arrangement past the blood spot sensing apparatus 25 and move to the side of the conveyor which extends along the receiving or infeed end of the egg grader conveyor 20. The conveyor 20 may comprise any number of rows, six being illustrated, and the spacing of the rows may differ from the spacing of the assemblies 40, due to the requirements of the grader. For example, 3⅛ inches on centers, since each carrier assembly is operated to dump an egg carried thereon into a pocket on the grader conveyor 20 by a separate trip or release rail 72. The release rails 72 are normally in axial alignment so as to provide a continuous rail and each individual rail 72 is operated by a cam 76 to effect the dumping of the egg carried on the assembly 40 at the proper time for loading into a pocket of the conveyor 20, after which the release rail springs back into alignment with adjoining rails so as to form a support rail for oncoming carriers. The trip rails 72 are operated in sequence and the operation is properly timed to effect the desired dumping of the eggs so as to properly feed them onto the conveyor 20.

When the blood spot sensing apparatus is employed with the transfer conveyor 10, as shown, the detector device 120 will operate the reject rail 127, when it determines that an egg is undesirable and the carrier finger 42 will swing to a position to discharge the egg into the reject pan 136 (FIGURE 1) for subsequent removal. The blood spot detector or sensing apparatus 25 is, of course, only one illustration of apparatus with which the conveyor 10 may be employed.

The transfer conveyor 10 is shown in a rectangular arrangement but it may, of course, be arranged in a different pattern depending upon the apparatus with which it is used.

While particular materials and specific details of construction are referred to it will be understood that other materials and different structural details may be resorted to without departing from the spirit of the invention as defined in the appended claims.

We claim:

1. An apparatus for transferring eggs from a receiving area where the eggs are fed to the apparatus in successive rows of a predetermined number with predetermined spacing in the rows to a discharge area where they are deposited singly for advance therefrom in successive rows which may contain a number and spacing differing from the number and spacing in the rows fed to the apparatus, said apparatus comprising an endless chain supported on a plurality of sprockets arranged in spaced relation in a generally horizontal plane with portions of the chain traversing a straight line path through the receiving area and the discharge area, respectively, pocket forming assemblies carried outboard of the chain which pocket assemblies are spaced in accordance with the spacing of the eggs in the rows fed to the apparatus, said pocket assemblies each including a spool member fixed on the chain and an arm member which is pivotally mounted on the chain and which co-operates with the fixed spool member, when in a generally horizontal position, to provide a pocket for supporting an egg, said arm member having a tail piece and track forming rails spaced along said chain for engaging said tail piece to hold said arm in egg supporting position for receiving an egg in the receiving area and between said receiving area and said discharge area.

2. Apparatus for conveying eggs in single line arrangement from the discharge end of a multiple row feeding conveyor to a delivery area and for discharging the eggs at the delivery area in predetermined row forming relation which apparatus comprises an endless chain mounted on spaced sprockets which are arranged in a generally horizontal plane and mounted on parallel vertical shafts so that portions thereof traverse a path extending along the discharge end of said feeding conveyor and a straight line path through said discharge area and pocket forming egg supporting assemblies spaced along said endless chain, said assemblies each including a spool member mounted on a shaft which extends between upstanding arms of an inverted U-shaped bracket disposed on the top side of the chain, an L-shaped arm having one leg secured intermediate its ends on a pivot the axis of which coincides with the axis of said spool and having its other leg extending parallel with said axis and spaced outboard of said sloop for co-operation with said spool in one position thereof to provide an upwardly facing egg supporting pocket and in another position thereof permitting an egg to roll out of the pocket, and means spaced along a predetermined portion of the path of said conveyor for holding said arm in egg supporting position.

3. In an egg conveying apparatus an endless chain mounted on spaced sprockets for travel in a generally horizontal plane and in a closed path, a plurality of pocket forming devices mounted in outwardly extending spaced relation along said chain, each said pocket forming device having a fixed spool-like member and a co-operating pivotally mounted arm member which has a portion with its long axis parallel with the long axis of said spool-like member and spaced radially therefrom, said arm member having a tail piece extending inboard of the path of the conveyor, and track forming members extending along portions of the path of said chain and engaging with said tail piece to hold the arm member in an elevated egg supporting position, portions of said track forming members being fixed along said path and other portions thereof being mounted for movement to a non-operative position so as to allow said arm member to pivot outwardly and downwardly of the path of said conveyor thereby to discharge an egg supported in said pocket device by gravity outboard of said conveyor.

4. An apparatus for transferring eggs from a receiving area where the eggs are fed to the apparatus in successive rows of a predetermined number to a discharge area where they are deposited for advance therefrom in predetermined sequence, said apparatus comprising an endless carrier member mounted on a plurality of support members arranged in spaced relation in a generally horizontal plane with a portion of the carrier member traversing a straight line path through the receiving area, pocket forming assemblies extending in spaced relation on the carrier member which pocket assemblies each include a spool member fixed on the carrier member and an arm member pivotally mounted thereon and co-operating with the fixed spool member, when in a generally horizontal position, to provide an upwardly opening pocket for supporting an egg, said arm member having a tail piece and track forming members disposed along the path of said carrier member for engaging said tail piece to hold said arm in egg supporting position for receiving an egg at said egg receiving area and for advancing the same to said egg discharge area.

5. An apparatus for transferring eggs from a receiving area where the eggs are fed to the apparatus in successive rows of a predetermined number to a discharge area where they are deposited for advance therefrom in predetermined sequence, said apparatus comprising an endless chain supported on a plurality of sprockets which are arranged in spaced relation in a generally horizontal plane with a portion of the chain traversing a straight line path through the receiving area, pocket forming assemblies spaced on said chain and extending outboard thereof which pocket assemblies include a spool-like member fixed on the chain and an L-shaped arm member pivotally mounted on the chain and co-operating with the fixed spool member, when in a generally horizontal position, to provide a pocket for supporting an egg, said arm member having a tail forming portion extending inboard of its pivotal mounting and track forming members disposed along portions of the path of said chain for engaging said tail portion to hold said arm in egg supporting position.

6. In an egg conveying apparatus an endless traveling chain mounted on spaced sprockets which are disposed in a generally horizontal plane, a plurality of pocket forming devices mounted in outwardly extending spaced relation along said chain, each said pocket forming device having a fixed spool-like member and a co-operating pivotally mounted arm member which has a portion with its long axis parallel with the long axis of said spool-like member and spaced radially therefrom, said arm member having a tail piece extending inboard of the path of the conveyor, and track forming members extending along portions of the path of said chain and engaging with said tail piece to hold the arm member in an elevated egg supporting position, portions of said track forming members being fixed along said path and other portions thereof being mounted on pivoted arms which are swingable to a non-operative position so as to allow said arm member to pivot relative to the path of said conveyor and to discharge an egg from the pocket by gravity.

7. Apparatus for conveying eggs in single line arrangement from the discharge end of a multiple row feeding conveyor to a delivery area and for discharging the eggs at the delivery area in predetermined sequence, said apparatus comprising an endless traveling chain mounted on spaced sprockets which are arranged in a generally horizontal plane and mounted on parallel vertical shafts so that the chain transverses a path having a portion extending along the discharge end of said feeding conveyor, and pocket forming egg supporting assemblies spaced along said endless chain, said assemblies each including a spool mounted for rotation on a hollow shaft which extends between upstanding arms of an inverted U-shaped bracket disposed on the top side of the chain, an L-shaped arm having one leg secured intermediate its ends on a pivot shaft received in said hollow spool shaft and having its other leg extending parallel with the axis of the spool shaft and spaced outboard thereof for co-operation with said spool in one position thereof to provide an upwardly facing egg supporting pocket and in another position thereof allowing eggs to roll outwardly and discharge from the pockets, and fixed means spaced along a predetermined portion of the path of said conveyor for holding said arm in egg supporting position.

8. An apparatus for conveying eggs from a receiving area where the eggs are fed to the apparatus in successive rows of a predetermined number with predetermined spacing in the rows to a discharge area where they are deposited for advance therefrom singly or in successive rows with the spacing differing from the spacing in the rows fed to the apparatus, said apparatus comprising a continuously traveling endless chain supported on a plurality of sprockets arranged in spaced relation in a generally horizontal plane with portions of the chain traversing a straight line path through the receiving area, pocket forming assemblies carried on the chain, said pocket assemblies being spaced in accordance with the spacing of the eggs in the rows fed to the apparatus, said pocket assemblies each including a spool member fixed on the chain and an arm member which is pivotally mounted on the chain so as to co-operate with the fixed spool member, in one position thereof, to provide a pocket for supporting an egg therein, said arm member having a tail piece and track forming members extending along the path of said chain for engaging said tail piece to hold said arm member in egg supporting position for receiving an egg in the receiving area and between said receiving area and said discharge area.

9. An apparatus as recited in claim 8 and a portion of said track forming members in said discharge area being mounted for movement to a position where the tail piece of a pocket forming assembly is free of engagement therewith so that the arm member may swing to a position for discharging the egg from the pocket.

10. An apparatus as recited in claim 8 and portions of said track forming members in said discharge area being mounted on pivotally mounted arms which are adapted to swing said track portions to positions where they are clear of the tail pieces whereby the arms of the pocket forming assemblies are free to swing to positions to discharge eggs from the pockets of said assemblies.

11. An apparatus as recited in claim 10 and adjustable cam means for controlling the swinging movement of said track supporting arms.

12. In an egg conveying apparatus, an endless chain mounted on spaced sprockets for travel in a generally horizontal plane and in a closed path, a plurality of pocket forming devices mounted in outwardly extending spaced relation along said chain, each said pocket forming device having a fixed spool-like member and a pivotally mounted arm member co-operating therewith to form an egg supporting pocket, which arm member has a portion with its long axis parallel with the long axis of said spool-like member and spaced radially therefrom, said arm member having a tail piece extending inboard of the path of the conveyor, and track forming members extending along portions of the path of said chain and engaging with said tail piece to hold the arm member in an elevated position for receiving and supporting an egg in the pocket thus formed, portions of said track forming members being fixed along said path and other portions thereof being mounted for movement to a non-operative position free of engagement by said tail piece so as to allow said arm member to pivot outwardly and downwardly of the path of said conveyor thereby to discharge an egg supported in said pocket device by gravity outboard of said conveyor.

13. In an egg conveying apparatus as recited in claim 12 and motion dampening members mounted adjacent a portion of said conveyor.

14. In an egg conveying apparatus as recited in claim 12 and pad-like motion dampening members carried on a frame pivotally mounted adjacent the path of said chain and above the path of said pocket forming devices and cam operated means connected to said frame to pivot the same so as to move said pad-like members toward and from said pocket forming devices.

15. An apparatus for transferring eggs from a receiving area where the eggs are fed to the apparatus in predetermined arrangement to a discharge area where they are deposited for advance therefrom in predetermined sequence, said apparatus comprising an endless carrier member mounted on a plurality of support members arranged in spaced relation in a generally horizontal plane and a plurality of pocket forming assemblies mounted in spaced relation on the carrier member which pocket assemblies each include a spool-like member supported between the upstanding legs of a U-shaped bracket which is secured on said carrier member and an arm member having a pivot shaft journaled in the upstanding legs of said bracket and an angular end portion which co-operates with the fixed spool member, when in a generally horizontal position, to provide therebetween an upwardly opening pocket for supporting an egg, said arm member having a tail forming portion, and track forming members disposed along the path of said carrier member for engaging the tail forming portion of said arm so as to hold said arm in egg supporting position at the egg receiving area and means for withdrawing parts of said track members at the egg discharge area so as to cause the arm to pivot to a position to dump the egg.

16. Appratus for conveying eggs in single line arrangement from the discharge end of a multiple row feeding conveyor to a delivery area and for discharging the eggs at the delivery area in predetermined sequence, said apparatus comprising an endless traveling chain mounted on spaced sprockets which are arranged in a generally horizontal plane and mounted on parallel vertical shafts so that the chain transverses a path having a portion extending along the discharge end of said feeding conveyor, and pocket forming egg supporting assemblies spaced along said endless chain, said assemblies each including a spool mounted for rotation on an axis which extends between upstanding arms of an inverted U-shaped bracket upstanding from the chain, an L-shaped arm having one leg secured intermediate its ends on a pivot so as to rotate about the same axis as the spool and having its other leg extending parallel with the axis of rotation of the spool and spaced outboard thereof for co-operation with said spool in one position thereof to provide an upwardly facing egg supporting pocket and adapted to be swung downwardly so as to allow eggs to roll outwardly and discharge from the pockets, and means spaced along a predetermined portion of the path of said conveyor for holding said arm in egg supporting position.

17. In an egg handling apparatus an endless chain mounted on spaced sprockets for travel in a generally horizontal plane and in a closed path, a plurality of pocket forming devices mounted in outwardly extending spaced relation along said chain, each said pocket forming device having a fixed spool-like member and a pivotally mounted arm member co-operating therewith to form an egg supporting pocket, which arm member has a portion with its long axis parallel with the long axis of said spool-like member and spaced radially therefrom, and track forming members extending along portions of the path of said chain and engaging with said arm member to hold said arm member in a position for receiving and supporting an egg in the pocket thus formed, portions of said track forming members being fixed along said path and other portions thereof being mounted for movement to a non-operative position so as to allow said arm member to pivot downwardly of the path of said conveyor thereby to discharge an egg supported in said pocket device by gravity.

18. In an egg handling apparatus as recited in claim 17 and motion dampening members movably mounted adjacent a portion of the path of said chain and engageable with eggs discharged from said pocket forming devices.

19. In an egg handling apparatus as recited in claim 17 and a device for sensing blood spots mounted adjacent said chain, and means responsive to the operation of said sensing device for operating a movably mounted portion of said track members so as to permit swinging of said arm member to an egg dumping position.

20. An apparatus for handling eggs comprising a traveling conveyor mounted for movement from a receiving area where the eggs are fed thereto to a discharge area where they are deposited for advance therefrom singly or in successive rows, said conveyor having spaced pocket forming assemblies carried thereon which pocket assemblies include a spool member fixed on the conveyor and an arm member which is pivotally mounted and co-operates with the fixed spool member in one position thereof to provide a pocket for supporting an egg therein, track forming members extending along the path of said conveyor for engaging said arm member to hold said arm member in egg supporting position in the egg receiving area and normally between said egg receiving area and said egg discharge area, means disposed along said conveyor between the egg receiving area and the egg discharge area for sensing an egg which is undesirable due to blood spots, or the like, and means responsive to said sensing means for moving a portion of said track forming member to an inoperative position so as to permit the arm member of the pocket assembly to pivot to a position to dump the egg from the pocket.

No references cited.

M. HENSON WOOD, JR., *Primary Examiner.*

R. A. SCHACHER, *Assistant examiner.*